March 29, 1960  A. E. MARTIN  2,930,279
DOUBLE BEAM SPECTROMETERS
Filed April 4, 1956
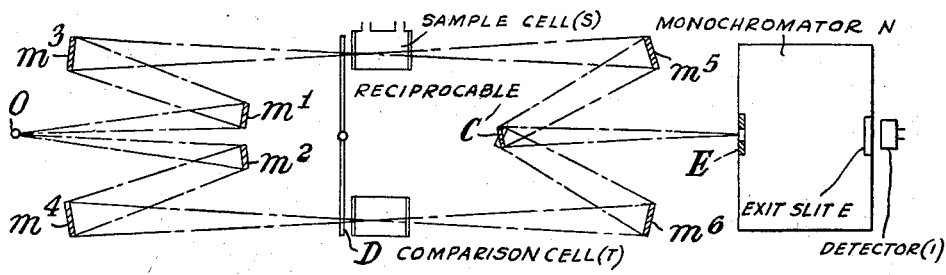
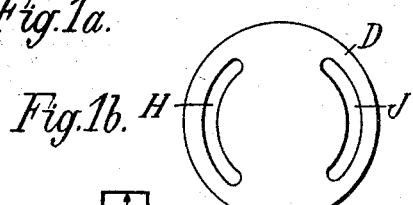
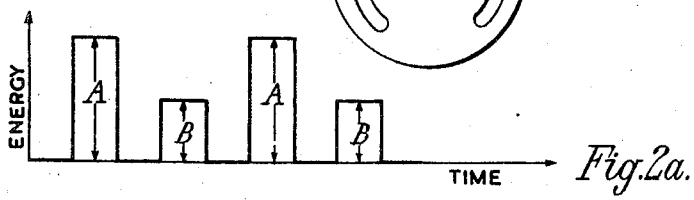
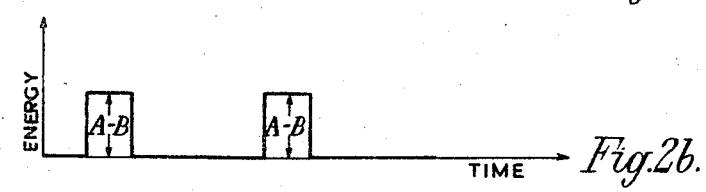
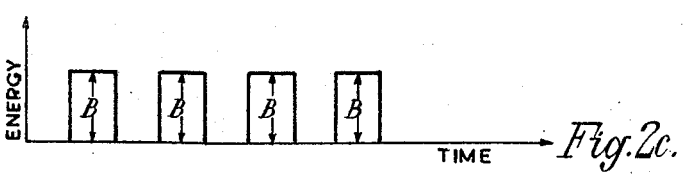
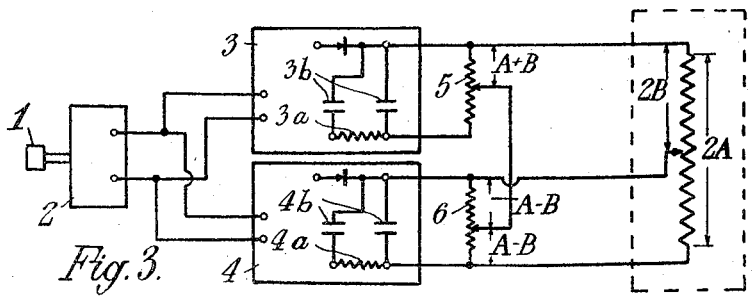

United States Patent Office 2,930,279
Patented Mar. 29, 1960

2,930,279

DOUBLE BEAM SPECTROMETERS

Albert E. Martin, Newcastle-upon-Tyne, England, assignor to C. A. Parsons & Company Limited, Newcastle-upon-Tyne, England Application April 4, 1956, Serial No. 575,989

Claims priority, application Great Britain April 13, 1955

3 Claims. (Cl. 88—14)

This invention relates to double beam spectrometers of the kind in which radiation from a suitable source such as a Nernst filament, is switched a number of times a second alternately by way of two beam paths (one including a sample and the other a comparison substance) before entering the slit of a monochromator in which the radiation is dispersed so as to form a spectrum a given portion of which is selected and passed through an exit slit from the monochromator to fall upon a detecting device which measures the intensity of the radiation passing through the slit.

The double-beam unit enables the energy in two separate beams to be compared by allowing radiation from the two paths to fall on the entrance slit of the monochromator alternately. Any difference in energy between the two beams results in an alternating signal at the detector, the phase of which is dependent on which beam is the greater in energy; after amplification and synchronous rectification this signal is used to restore automatically, usually by means of a servo system, the balance between the two beams by controlling the position of a variable aperture which can be introduced into the blank beam. The size of this variable aperture may be altered automatically until equality between the two beams at the particular wavelength in question is established, at which point the alternating signal from the detector falls to zero and the variable aperture then remains stationary. The position of this aperture gives a direct measure of the percentage transmission of the sample and by linking it to a recording pen a convenient means of obtaining a record of the spectral transmission of the sample is provided.

Difficulties are often encountered with the automatic means for restoring the balance in the two beams through the variable aperture to give a reading of percentage transmission, and the object of the present invention is to provide improved means of obtaining double-beam operation in which the electrical part of the double-beam system is greatly simplified and a standard potentiometer recorder can be used for recording percentage transmission.

The invention consists in a double beam spectrometer comprising a source of radiation, two separate paths for said radiations, means for introducing a sample substance into one radiation path and a comparison substance into the other path, means for focussing radiations from each beam path alternately on an entrance slit of a monochromator for isolating given wavelengths, and for chopping the radiations prior to their entry into the monochromator whereby the radiations enter the monochromator for and are cut off from the monochromator for approximately equal periods, detection means adapted to receive radiations emanating from said monochromator and to produce an electrical signal which is a function of the energy content of said radiations, amplification means receiving said signal from the detection means and applying it to filter circuits adapted to select a signal at chopping frequency that is to say the number of times a second that radiations are cut off by the chopper from the slit of the monochromator and a signal at half chopping frequency, means for rectifying the signal from said filter circuits to produce D.C. voltages which are fed to two potentiometers which are adapted to add and subtract the voltages to produce resultant voltages proportional to the radiation of given wavelengths transmitted by comparison and sample substances respectively, and self balancing potentiometer recording means receiving said resultant voltages and recording the transmittance of the sample.

The invention also consists in a double beam spectrometer substantially as hereinafter described with reference to the accompanying drawings.

Referring to the accompanying diagrammatic drawings:

Figure 1(a) illustrates a part of a double beam spectrometer embodying the present invention.

Figure 1(b) illustrates a form of chopper device for use therewith.

Figure 2(a) illustrates the general form of energy output from the detector.

Figures 2(b) and 2(c) represent two periodic functions which when added together produce the wave form of Figure 2(a), and Figure 3 illustrates an amplifier, filter and potentiometer circuit that may be used in carrying the present invention into effect.

In carrying the invention into effect in one form by way of example as illusrated in Figure 1 a double beam spectrometer comprises a source of radiation O, radiations from which are directed by mirrors $M_1$, $M_2$ and $M_3$, $M_4$ into two separate paths, sample cells are inserted in one beam path and a comparison cell T is inserted in the other. After passing through sample and comparison cells the radiations impinge on mirrors $M_5$ and $M_6$ which direct them onto a device C which comprises two mirrors at a fixed angle to one another and arranged one above the other, both mirrors being reciprocable so as to direct radiation from each path alternately onto the entrance slit E of a monochromator N for isolating given wavelengths.

A rotating apertured disc D is positioned so as to control the radiation in each path as can be seen from Figure 1(a). Details of the disc D are shown in Figure 1(b).

A pair of reciprocating plane mirrors driven by a synchronous motor as described in U.S. Backhouse Patent No. 2,604,810, issued July 29, 1952, for Improvements in Double Beam Optical System Applicable to Spectrometers and Other Instruments is used as a beam alternator and in addition a rotating apertured disc D is added as shown in Figures 1(a) and 1(b). The apertures H, J are diametrically opposite and each subtends approximately a right angle at the centre of the disc. The disc D rotates in synchronism with the oscillatory motion of the reciprocating mirrors, one revolution of the disc occupying the same time as a complete oscillatory cycle of the plane mirrors.

During the time that radiation passes through the apertures H, J one of the pair of reciprocating mirrors is in a suitable position for directing radiation onto the spectrometer slit E. By the time the chopping disc has turned through 180° and the apertures have changed places, the reciprocating mirrors C have also changed over and radiation from the second beam is directed onto the slit E of the monochromator. The radiations emanating from the monochromator exit slit F fall on a detector 1 which produces an electrical output which is a function of the energy content of said radiation.

The output from the detector is of the general form indicated in Figure 2(a) where A represents the energy of a particular wavelength of radiation traversing the comparison cell, while B represents the radiation at the same wavelength traversing the sample. The information required, of course, is the transmittance of the sample, $B/A$.

If the detector has a sufficiently rapid response the output from it will have the square wave-form shown in Figure 2(a) and this will be assumed in the following discussion.

The argument is not materially affected, however, even if the detector imposes some distortion on the wave form of Figure 2(a), although the discussion then becomes more complicated. Assuming the output from the detector to have this form, then with equal duration of signal and cut-off periods, it is easy to see that this can be regarded as the sum of the two periodic functions shown in Figure 2(b) and Figure 2(c), since by adding these together the wave form of Figure 2(a) is reproduced. By Fourier analysis it can be shown that the wave form of Figure 2(b) contains a fundamental component of frequency $f$ and amplitude $$\frac{(A-B)\sqrt{2}}{\pi} \sin (pt+\pi/4)$$

where $p=2\pi f$, as well as an overtone of frequency $2f$ with amplitude $$\frac{(A-B)}{\pi} \sin 2pt$$

$2f$ is the chopping frequency, that is to say the number of times per second that radiations are cut off by the chopper D from the slit of the monochromator.

Similarly, the wave form of Figure 2(c) contains a fundamental of frequency $2f$ and amplitude $$\frac{2B}{\pi} \sin 2pt$$

We thus obtain $$\frac{(A-B)}{\pi}\sqrt{2} \sin (pt+\pi/4)$$

for the component of frequency $f$ and $$\frac{A+B}{\pi} \sin 2pt$$

for the component of frequency $2f$. By passing the output from the detector 1 into a high-gain amplifier 2 (Figure 3) provided with filter circuits, 3, 4 comprising resistors $3a$, $4a$ and capacitors $3b$, $4b$ able to select the two frequencies $f$ and $2f$ without interference from each other, these, after rectification and smoothing by conventional methods, provide D.C. voltages proportional to $A+B$ and $A-B$ (Figure 3). By adding these D.C. voltages in series in suitable proportions, obtained by means of potentiometers 5, 6, the B terms can be made to cancel and a voltage proportional to A is produced.

Similarly, by taking suitable proportions of the D.C. voltages and connecting in opposition, a voltage proportional to B is obtained. By adapting any self-balancing potentiometer recorder so that a voltage proportional to A is fed to the slide wire and voltage B is applied to the input terminals of the instrument, the position of the pointer will give the ratio $B/A$ which is the transmittance of the sample.

The adjustment of the instrument in practice is not difficult since the mixing of $A+B$ and $A-B$ can be checked by blanking off first beam A and then beam B. The corresponding output voltages should drop to zero in each case.

Although in the form of the invention considered, an optical system involving reciprocating mirrors has been described, the invention is in no wise limited to this system, and any alternative arrangement which allows radiation in two separate paths to be chopped and directed onto the slit of a monochromator in the manner indicated in Figure 2(a) is comprehended.

I claim:

1. A double beam spectrometer comprising a source of radiation, means for directing said radiation into two beam paths, means containing the sample substance in one path and comparison means in the other path, a monochromator for isolating given wavelengths, means for directing radiation from each path alternately into said monochromator whereby said monochromator receives radiation and is cut off from radiations for approximately equal periods, detection means adapted to receive radiations emanating from said monochromator and to produce an electrical signal which is a function of the energy content of said radiations, amplification means receiving said signal from said detection means, filter circuits adapted to select a signal at chopping frequency that is to say the number of times a second that radiations are cut off from the monochromator and a signal at half chopping frequency, comparison means for comparing the two signals, and means applying the output of the said amplification means to said filter circuits.

2. A double beam spectrometer in accordance with claim 1, in which the comparison means comprise means for rectifying the signals from the filter circuit to produce D.C. voltages which are fed to two potentiometers, means connecting the said potentiometers to add and subtract the voltages to produce resultant voltages proportional to the radiation of given wavelength transmitted by sample substance and comparison means respectively and a self balancing potentiometer recording means receiving said resultant voltages and recording the transmittance of the sample.

3. A double beam spectrometer in accordance with claim 1, in which the means for directing radiation from each path alternately into the monochromator comprise a pair of reciprocating mirrors at a fixed angle to one another and disposed one above the other and a rotating shutter containing two arcuate apertures diametrically opposite each other and each subtending a right angle at the center of the shutter.

References Cited in the file of this patent
UNITED STATES PATENTS

| | | |
|---|---|---|
| 2,442,910 | Thomson | June 8, 1948 |
| 2,680,989 | Savitzky et al. | June 15, 1954 |
| 2,710,559 | Heitmuller et al. | June 14, 1955 |
| 2,750,834 | Golay | June 19, 1956 |